(12) United States Patent
Smith et al.

(10) Patent No.: US 6,546,456 B1
(45) Date of Patent: Apr. 8, 2003

(54) METHOD AND APPARATUS FOR OPERATING VEHICLE MOUNTED DISK DRIVE STORAGE DEVICE

(75) Inventors: Gordon James Smith, Rochester, MN (US); George Willard Van Leeuwen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 09/657,879

(22) Filed: Sep. 8, 2000

(51) Int. Cl.$^7$ .............................. G06F 13/00; G06F 5/06
(52) U.S. Cl. ...................... 711/112; 711/113; 711/170; 710/52; 710/56; 713/1
(58) Field of Search ...................... 711/112, 118, 711/170, 113; 710/52, 56; 714/6; 713/1, 2

(56) References Cited

U.S. PATENT DOCUMENTS

| | | | | |
|---|---|---|---|---|
| 5,764,430 A | * | 6/1998 | Otteson et al. | 360/73.03 |
| 5,794,164 A | * | 8/1998 | Beckert et al. | 701/1 |
| 6,009,363 A | * | 12/1999 | Beckert et al. | 701/33 |
| 6,292,440 B1 | * | 9/2001 | Lee | 369/7 |
| 6,332,175 B1 | * | 12/2001 | Birrell et al. | 711/112 |

FOREIGN PATENT DOCUMENTS

WO            9921306     *    4/1999

OTHER PUBLICATIONS

"Non–Mechanical Shock Proofing of Mass Storage Subsystems," IBM Tech. Disc. Bull., vol. 37, No. 11, Nov. 1, 1994, pp. 21–24.*

* cited by examiner

Primary Examiner—Glenn Gossage
(74) Attorney, Agent, or Firm—Roy W. Truelson

(57) ABSTRACT

A system and method for operating a motor vehicle based data processing system having at least one rotating magnetic disk drive data storage device are disclosed. Sequential presentation data stored on a rotating magnetic disk drive installed in a motor vehicle or automobile is buffered and the context is saved in sufficient amount to transcend a time interval of data unavailability when a disk drive is initially powered up. When the vehicle is shut off and the drive is powered down, the data to be presented in the immediate future is saved in a non-volatile buffer. The amount of data saved in the buffer is sufficient to span the time interval that it takes the disk drive to power up and become data accessible. Preferably, the buffer is a general purpose buffer for use by the vehicle's on-board computer system, the amount of memory allocated to the buffer varying with the present state of the vehicle and disk drive, and other parameters. The disk drive may be used, among other things, for storing and retrieving multimedia data such as digitized music and/or video.

16 Claims, 6 Drawing Sheets

METHOD AND APPARATUS FOR OPERATING VEHICLE MOUNTED DISK DRIVE STORAGE DEVICE

FIELD OF THE INVENTION

The present invention relates to rotating disk data storage devices, and in particular, to use of such storage devices in a motor vehicle environment.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modern computer systems require large capacity mass data storage devices. While various data storage technologies are available, the rotating magnetic rigid or hard disk has become by far the most ubiquitous. Such a disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystems, each one of which is needed for proper drive operation. Despite this complexity, rotating magnetic disk drives have a proven record of capacity, performance and cost which make them the storage device of choice for a large variety of applications.

Rotating magnetic disk drives were originally installed in so-called mainframe computing environments, which typically maintained a very controlled environment. That is, due to the complexity and sensitivity of the various computer system components, temperature, humidity and other factors were maintained within a narrow range. However, as computing machinery has become more ubiquitous, it has been necessary to design components which will tolerate a wider range of environments. Thus, disk drive storage devices have progressively been designed for use in desktop personal computers, and eventually in laptop and other portable devices.

Given the advantages of rotating magnetic disk drives, it would be desirable to use such devices in an even greater range of applications. One potential area of application is in on-board data storage permanently installed in an automobile.

As in well known, modern automobiles are incorporating ever greater electronic capabilities. A modern automobile typically contains an on-board processor, on-board memory in the form of semiconductor memory, and various I/O devices such as sensors, gauges, control mechanisms, warning systems, and the like. Thus, while it is not always recognized as such, a modern automobile contains all the components while define a basic computer system. It would be desirable to use this on-board computer system for an even greater range of tasks than is typical today. These tasks may be related to the function of the automobile itself, or may simply be tasks for the convenience of the driver or passengers, such as providing entertainment, news, or other information.

When the on-board computing system of a typical automobile is compared with that of a desktop computer, one glaring deficiency of the typical automotive computing system is data storage. A typical desktop system contains one or more rotating magnetic disk drive storage devices, capable of storing massive amounts of data. The automotive system typically does not, and is thus generally used for tasks which do not require this magnitude of data storage. The incorporation of disk drive storage in the on-board systems of automobiles would open up a new range of capabilities for such systems.

Existing rotating magnetic disk drive data storage devices were not designed for automotive use. Conversion of such drives to automotive use requires consideration of numerous design implications, and the adaption of new strategies for the design and use of such drives. There is therefore a need for design and operational modifications which will enhance the ability of such drives to operate in a motor vehicle environment. In particular, existing rotating magnetic disk drive storage devices do not operate well at temperature extremes, and may require considerable time to power up and provide data.

SUMMARY OF THE INVENTION

In accordance with the present invention, certain data stored on a rotating magnetic disk drive data storage device installed in a motor vehicle is presented serially to the user. This data is buffered and the presentation context is saved in sufficient amount to transcend a time interval of data unavailability when a disk drive is initially powered up.

In the preferred embodiment, the disk drive is used, among other things, for storing and retrieving multimedia data which is presented serially to a user. An example of such multimedia data is digitized music, although other examples exist. When the vehicle is shut off and the drive is powered down, the data to be presented in the immediate future is saved in a non-volatile but immediately available buffer, which is preferably a dynamic semiconductor random access memory (RAM) which receives power at all times from the motor vehicle's battery. The "context" of presentation, i.e., the multimedia selection or selections being played, their order, and the point of interruption is also saved. The amount of data saved in the buffer is sufficient to span the time interval that it takes the disk drive to power up and become data accessible. In an automobile which may be subject to extreme cold when parked, this could be several minutes.

In one embodiment, an estimate is made of the amount of time required to power up the disk drive, and a variable amount of data is buffered sufficient to span the estimated interval.

Preferably, the buffer is a general purpose buffer for use by the vehicle's on-board computer system. When the vehicle is running, this buffer may be used for storage of vehicle operating parameters, control programs, user information, and other data. When the vehicle is not operating, the amount of buffer required for these other functions is considerably reduced, and thus the same buffer space can be used for storing multimedia data for playback during the time interval when the disk drive is unavailable, as described herein.

Thus, a data buffering system in conjunction with a disk drive as described herein enables data from the drive to be available notwithstanding the inherent lag time in powering up a drive. Such a buffering system is particularly beneficial when powering up a disk drive in adverse weather conditions.

The details of the present invention, both as to its structure and operation, can best be understood by reference to the accompanying drawings, in which like reference numerals refer to like parts, and in which:

DETAILED DESCRIPTION OF THE PREFERRED EMBODIMENT

Overview of Disk Drive Technology

Figure 1:
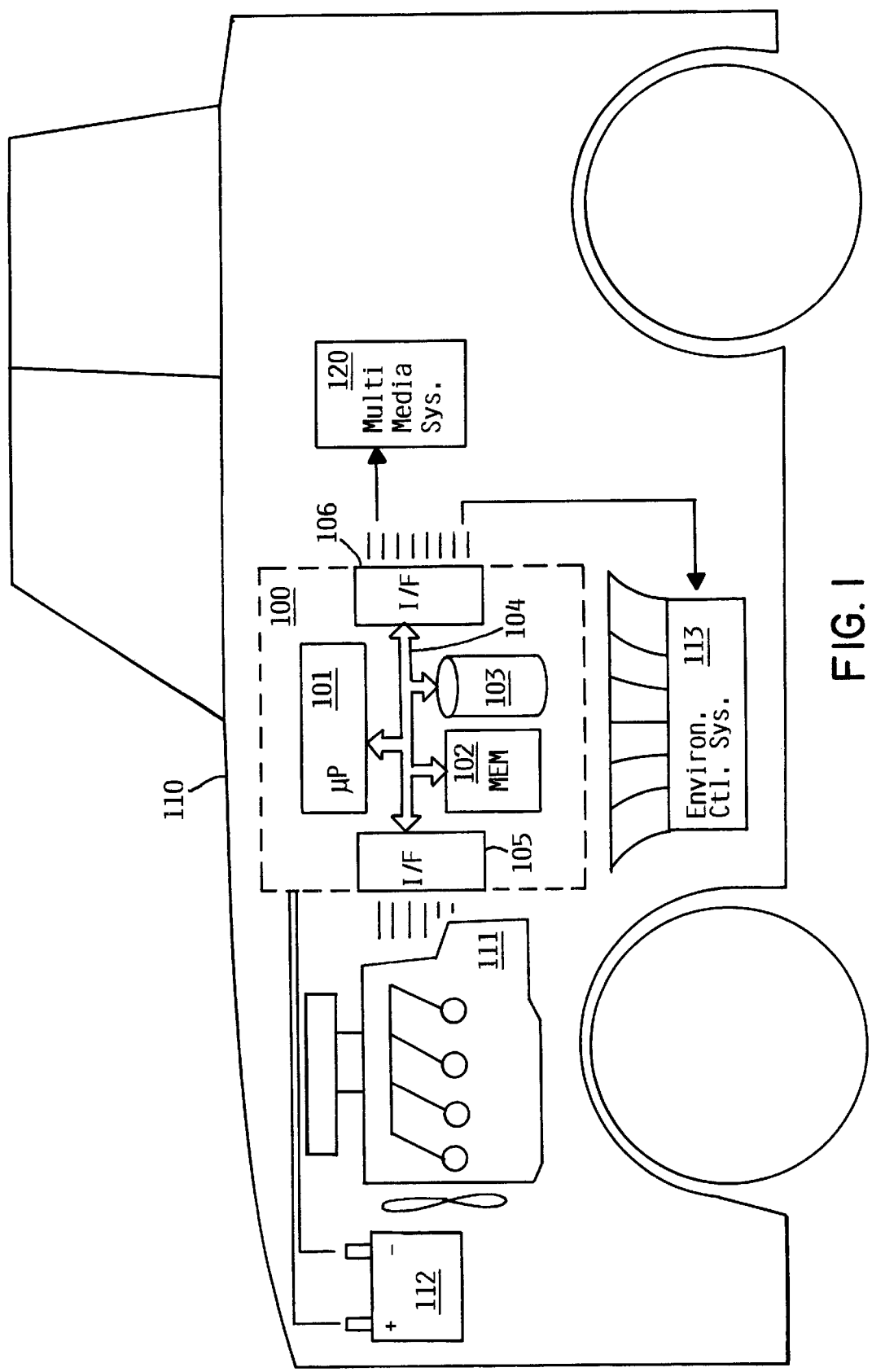
FIG. 1 depicts the major components of a motor vehicle based data processing system, in accordance with the preferred embodiment of the present invention.

A rotating magnetic rigid or hard disk drive typically contains one or more smooth, flat disks which are permanently attached to a common spindle or hub. Where more than one disk is used, the disks are stacked on the spindle parallel to each other and spaced apart so that they do not touch. The disks and spindle are rotated in unison at a constant speed by a spindle motor.

The spindle motor is typically a brushless direct current (DC) motor having a multi-phase electromagnetic stator and a permanent magnet rotor. The different phases of the stator are sequentially driven with a drive current to rotate the rotor.

Each disk is formed of a solid disk-shaped base or substrate, having a hole in the center for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disk or disks in the magnetizable layer. To do this, minute magnetized patterns representing the data are formed in the magnetizable layer. The data patterns are usually arranged in circular concentric tracks, although spiral tracks are also possible. Each track if further divided into a number of sectors, Each sector thus forms an arc, all the sectors of a track completing a circle.

A moveable actuator positions a transducer head adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding the axis having comb-like arms extending toward the disk (which is, for this reason, sometimes referred to as the "comb"); a set of thin suspensions attached to the arms, and an electro-magnetic motor on the opposite side of the axis. The transducer heads are attached to the end of the suspensions opposite the comb, one head for each suspension. The actuator motor rotates the actuator to position the head over a desired data track (a seek operation). Once the head is positioned over the track, the constant rotation of the disk will eventually bring the desired sector adjacent the head, and the data can then be read or written. The actuator motor is typically an electro-magnetic coil mounted on the actuator comb and a set of permanent magnets mounted in a stationary position on the base or cover; when energized, the coil imparts a torque to the comb in responses to the magnetic field created by the permanent magnets.

Typically, a servo feedback system is used to position the actuator. Servo patterns identifying the data tracks are written on at least one disk surface. The transducer periodically reads the servo patterns to determine its current deviation from the desired radial position, and the feedback system adjusts the position of the actuator to minimize the deviation. Older disk drive designs often employed a dedicated disk surface for servo patterns. Newer designs typically use embedded servo patterns, i.e., servo patterns are recorded at angularly spaced portions of each disk surface, the area between servo patterns being used for recording data. The servo pattern typically comprises a synchronization portion, a track identifying portion for identifying a track number, and a track centering portion for locating the centerline of the track.

The transducer head is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer. Several different transducer designs are used. Many current disk drive designs employ a thin-film inductive write transducer element and a separate magneto-resistive read transducer element.

The suspensions actually apply a force to the transducer heads in a direction toward the disk surface. The aerodynamic characteristics of the slider counter this force, and enable the slider to fly above the disk surface at the appropriate distance for data access. However, if the disk is not spinning, no aerodynamic force is applied, and the heads will come to rest on the surface of the disk. In many older disk drive designs, the heads are parked on the disk surface when the disk is stopped, often in a special area called a "landing zone". In many modern disk drives, particularly in portable devices, the heads are "unloaded" when the disk drive is not in operation, meaning that the heads are mechanically lifted away from the disk surface so that there will be no head/disk contact even if the spindle is not spinning (and no aerodynamic lifting force is applied to the heads). Unloading the heads when the spindle motor is stopped helps to prevent damage to the heads and/or disk surface in the event of shock, and makes it easier to start the disk spindle assembly spinning when the drive is restarted.

Insufficient flyheight could damage the disk or heads. The drive relies on the air pressure generated by the spinning disks to maintain a proper flyheight for data access. Insufficient rotational speed, or elevated temperatures within the drive, reduce the aerodynamic lift to the heads and may cause insufficient flyheight. Furthermore, an attempt to spin the disks when the device is outside its specified operating temperature range could also cause premature wear of bearings or other components. A disk drive typically checks spindle speed during operation and unloads the heads if the spindle speed is improper. Similarly, the heads are not moved from the unload device for data access at start-up until a pre-specified speed is achieved. These factors mean that there will be a substantial lag time before data can be accessed from a stone cold inactive drive, or from a drive which is too hot.

DETAILED DESCRIPTION

Referring to the Drawing, wherein like numbers denote like parts throughout the several views, FIG. 1 is a simplified drawing of a motor vehicle based data processing system, according to the preferred embodiment of the present invention. Motor vehicle based data processing system 100 is in fact a small on-board computer system, mounted within motor vehicle 110. System 100 is depicted in FIG. 1 in somewhat exaggerated scale relative to the size of vehicle 110 for clarity of illustration. System 100 includes programmable microprocessor or processor 101 which executes one or more programs embodied as sets of executable instructions, memory 102 for storing data including programs, and rotating magnetic disk drive storage device 103, for mass data storage. An internal data bus 104 provides communication among the various components of system 100.

System 100 further includes I/O interfaces 105, 106, for receiving and transmitting data to other parts of vehicle 110. Specifically, I/O interface 105 receives data from various sensors (not shown) which sense engine, environmental, and user provided parameters; and interface 105 provides output to various vehicle controls, such as fuel controls, air controls, ignition, etc., for proper operation of vehicle engine 111. I/O interface 106 communicates with vehicle multimedia system 120. Multimedia system 120 preferably provides audio data such as music, speech, etc. to a vehicle occupant, which may be from a recorded source such as disk drive 103, or may be received externally as an externally originated transmission, such as a radio broadcast. Multimedia system may optionally provide video, graphic or text images, etc. Such multimedia data may be provided for purposes of entertainment, education, information, and so forth. In its simplest embodiment, multimedia system 120 is an audio system which plays music or other audio programming, it being understood that the multimedia system could be considerably more complex.

I/O interface 106 further communicates with environmental control system 113, to control environmental system 113 under the direction of data processing system 100. Environmental system 113 controls one or more environmental parameters of disk drive 103. Environmental system 113 may be implemented in any of various ways. Since a typical motor vehicle 110 will contain an environmental control system for the comfort of the occupants (e.g., heating and air conditioning), disk drive 103 may be mounted within the passenger compartment of the vehicle, and environmental system 113 may be the same system which provides comfort to the vehicle occupants. Alternatively, environmental system 113 may be a completely separate system containing, e.g., a small electrical resistance heating element for heating disk drive 103, and a thermo-electric cooling element or a fan for cooling disk drive 103. As an additional alternative, a hybrid environmental control may be used, wherein disk drive 103 is mounted within the passenger compartment and is generally subject to the same environmental conditions as the vehicle occupants, but contains a small auxiliary electrical resistance heating element for more rapidly bringing the disk drive to operating temperature under extremely cold conditions.

Vehicle battery 112 provides electrical power to various vehicle components, and in particular provides electrical power to system 100.

Figure 2:
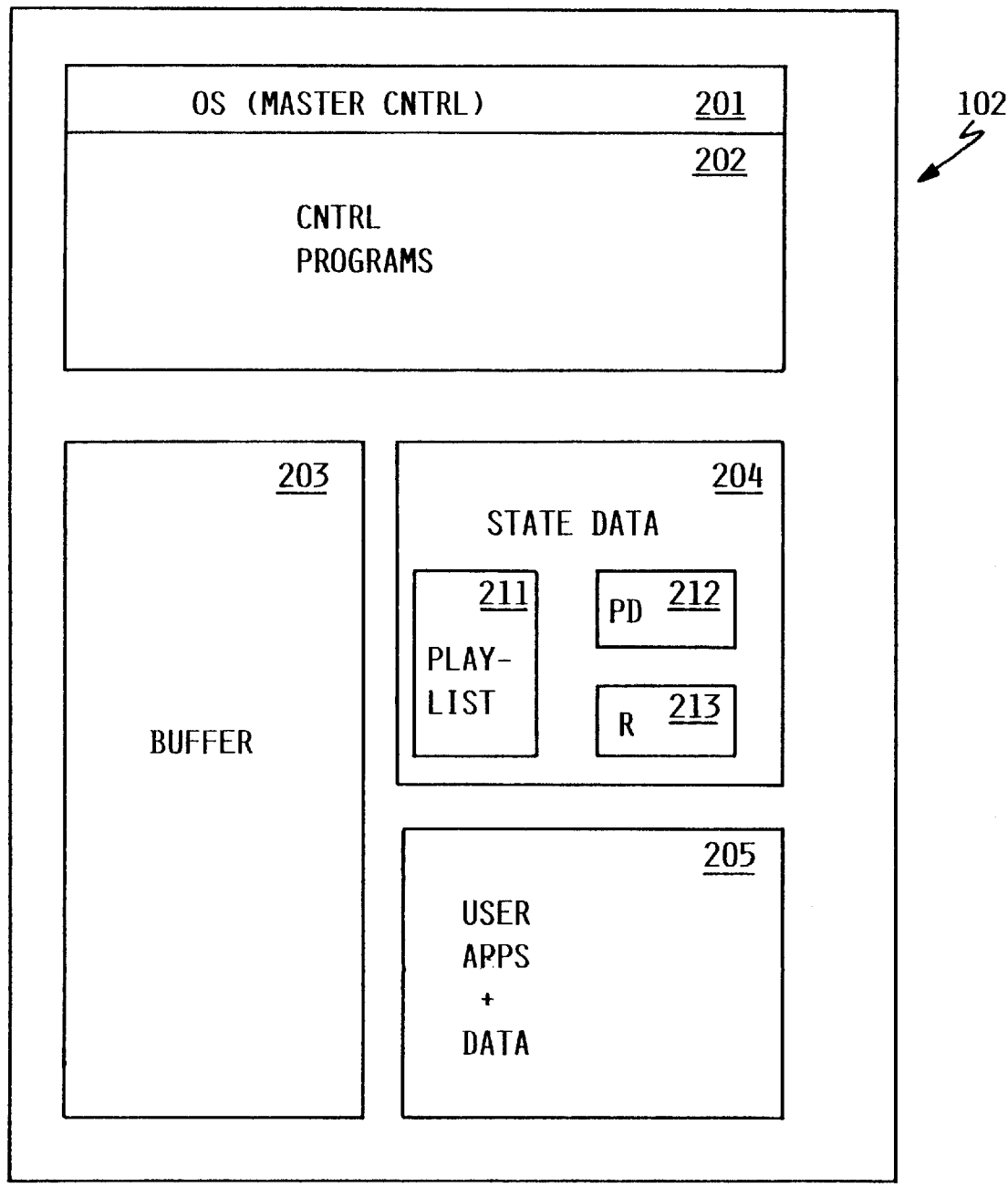
FIG. 2 is a conceptual representation of memory within a vehicle based data processing system, according to the preferred embodiment.

FIG. 2 is a conceptual representation of memory 102 within system 100. As shown in FIG. 2, memory 102 contains master control program 201, control programs 202, buffer 203, state data 204, and user applications and data 205. Control programs 202 include one or more program modules which direct the function of various vehicular systems, while state data 203 includes data about the current state of various vehicular systems needed for operation of the control programs. For example, one control program module may direct the function of the engine ignition and fuel systems; still another may control the braking system; another diagnostics, etc. At least one of the control program modules controls the operation of environmental system 113.

Master control program 201 is the control program for on-board processing system 100 itself. Its function is similar to that of an operating system in a full-fledged computer system. Specifically, it is responsible for allocating system resources to different concurrent control programs executing in processor 101, specifically processor resources and memory resources. It will be understood that the concurrent control of multiple vehicular systems in real time may require additional slave processors (not shown) or other hardware.

User applications and data 205 is intended as a general representation of any additional data processing application and its associated data which is not used to control or monitor vehicle functions. For example, such applications may include clocks and calendars, directional and navigation aids, travel logging, etc. Such applications may even be completely unrelated to vehicles and travel, e.g., video games, internet browsers, etc., which are provided purely for the amusement or enlightenment of the occupants.

Some of the data recorded in disk drive 103 is intended for sequential presentation to a user over a time interval. Multimedia data, and in particular audio and video data, are the primary examples of such sequentially presented data, although not necessarily the only data which is intended for sequential presentation. Buffer 203 is an area of memory reserved from temporary storage of data read from disk storage 103 and intended for sequential presentation to a user in the future. Once the data is presented to the user, it may be deleted from buffer 203. The operation and control of buffer 203 is described in greater detail herein.

Memory 102 is preferably a random access memory embodied in one or more semiconductor chips. At least a part of memory 102 (specifically, that part used for buffer 203) is read/write memory. Memory 102 may be entirely read/write memory, but it is preferable that at least some portions of master control program 201 and control programs 202 will be embodied in read-only memory (ROM) which is either non-erasable or erasable only with the use of special hardware. Memory 102 receives power from motor vehicle battery 112 at all times, even when the vehicle is not operating, and its contents are thus preserved. The amount of power required to maintain the contents of memory 102 is quite small for an automotive battery, and should not cause any appreciable battery drain.

It will be understood that FIG. 2 is intended as a simplified conceptual representation of memory 102. Memory 102 may be embodied in multiple chips, one or more of which are read/write, while one or more are read only. Furthermore, memory 102 may contain caches or other hierarchical levels of devices. Finally, it should be understood that all or portions of programs and data depicted as resident in memory 102 may be stored in disk drive data storage device 103, and loaded into memory 102 as needed. For example, infrequently used vehicle diagnostic routines which form a part of control programs 202 may be stored in disk drive 103, and loaded into read/write portions of memory 102 for execution by processor 101 when it is necessary to execute them. Master program 201 is responsible for loading data from disk drive 103 into memory 102 as needed.

Figure 3:
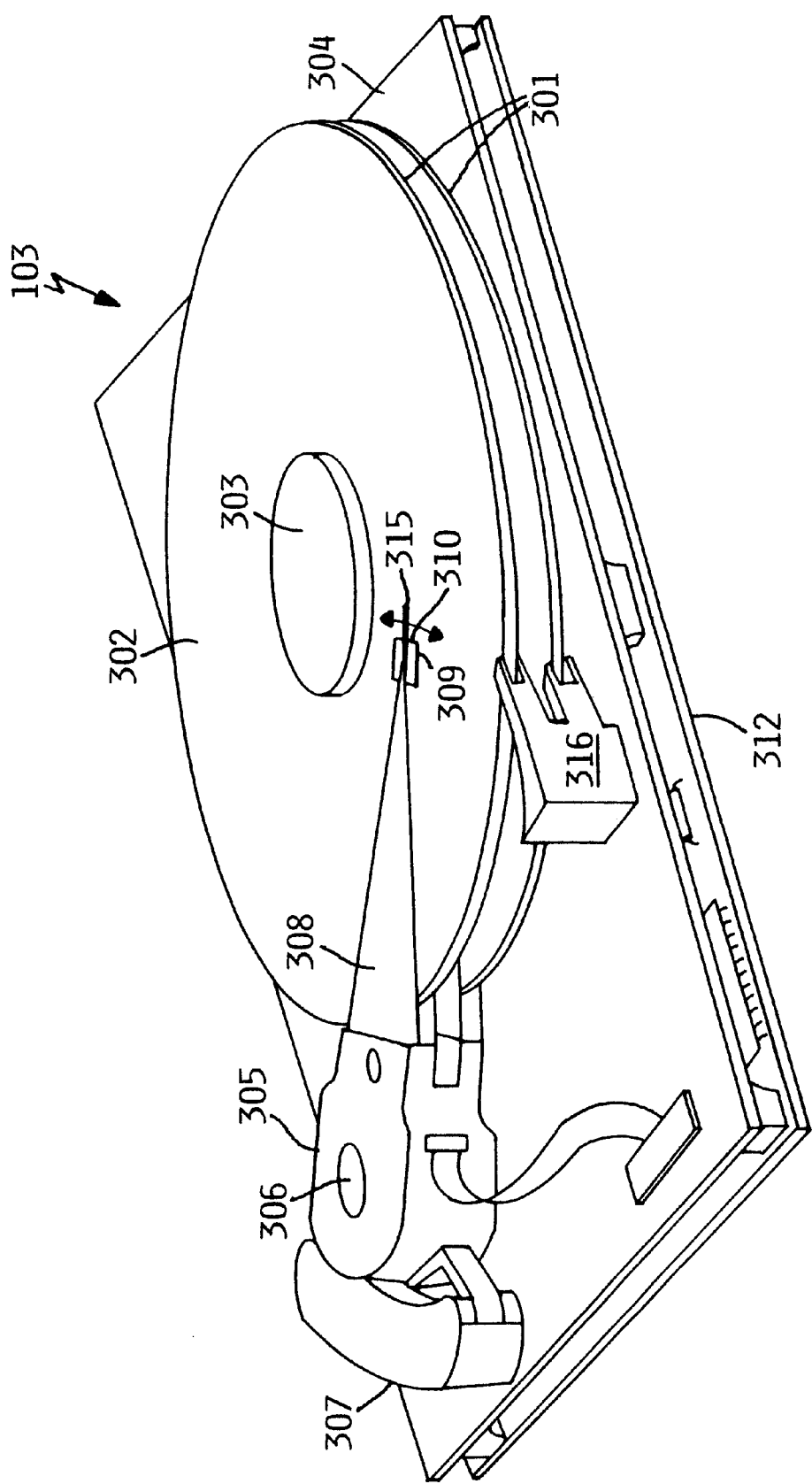
FIG. 3 is a simplified representation of an on-board rotating magnetic disk drive storage device according to the preferred embodiment.

FIG. 3 depicts in greater detail the major components of rotating magnetic hard disk drive data storage device 103, for use according to the preferred embodiment of the present invention. Disk drive 103 comprises rotatable disks 301, which are rigidly attached to hub assembly or spindle 303, which is mounted on disk drive base or housing 304. Spindle 303 and disks 301 are driven by a drive motor at a constant rotational velocity. The drive motor (not visible in FIG. 1) is contained within hub assembly 303. Data is recorded on the top and bottom surfaces 302 of each disk. Actuator assembly 305 is situated to one side of disks 301. Actuator 305 rotates through an arc about shaft 306 parallel to the axis of the spindle, driven by electro-magnetic motor 307, to position the transducer heads. A cover (not shown) mates with base 304 to enclose and protect the disk and actuator assemblies. Electronic modules for controlling the operation of the drive and communicating with another device, such as processor 101 (shown in FIG. 1), are mounted on circuit card 312. In this embodiment, circuit card 312 is shown mounted outside the enclosure formed by base 304 and the cover. However, the card 312 could also be mounted inside the head/disk enclosure, or a portion of the electronics may be mounted inside the enclosure, while another portion is mounted outside the enclosure. A plurality of head/suspension assemblies 308 are rigidly attached to the prongs of actuator 305. An aerodynamic slider 309 with a read/write transducer 310 is located at the end of each head/suspension assembly 308 adjacent disk surface 302.

In order to protect the disk surface and heads, and to make it easier to start the spindle motor from a dead stop, the slider and transducer head assembly 309/310 is "unloaded" when the disk drive is not in use, meaning that actuator 305 is rotated away from the center of disk 302 so that a projecting finger 315 at the end of each suspension assembly 308 engages a respective ramp surface of ramp assebmly 316, lifting the slider 309 away from the disk surface 302. The ramp and engaging finger are simply an example of one mechanism for unloading a transducer head, it being understood that other mechanisms are possible.

While disk drive 103 is shown with two disks having multiple disk surfaces for recording, it should be understood that the present invention could utilize a drive having a single disk, or having a larger number of disks, and that it would be possible to employ only a single disk surface of a disk for recording data.

Although certain disk drive features are shown and described above, it should be understood that these are by way of describing the preferred embodiment only, and it would be possible to practice the present invention using alternative disk drive design features.

In the preferred embodiment, master control program 201 resident in memory 102 and executing in processor 101 controls the allocation of memory space to buffer 203. Data stored on disk drive 103 and intended for sequential presentation, specifically, audio or other multimedia data for presentation to the vehicle occupant, is read from disk drive 103 into buffer 203. Master control program 201 allocates sufficient buffer space to transcend the mechanical latency of disk drive 103. Specifically, if drive 103 is shut down and its disks are not spinning, control program allocates sufficient buffer space to store sequential data for playback during the startup period. When the drive is re-started, master program 201 causes data from buffer 203 to be presented in the intended sequence during the time interval it takes disk drive 103 to become available, i.e., during the time interval it takes disk drive 103 to spin the disks to sufficient rotational velocity and to access data stored on the disks.

Preferably, four separate tasks execute in processor 101 to control the use of buffer 203 and presentation of sequential data to multimedia system 120. These tasks include an Interactive Control task, a Buffer Allocation task, a Buffer Fill task, and a Buffer Empty task. These tasks maintain and utilize Playlist 211, as well as two state flags: Playlist Defined (PD) flag 212 and Running (R) flag 213, as explained in greater detail below.

Playlist 211 is a variable sized list of one or more records to be sequentially presented from disk drive 103. Specifically, in the preferred embodiment, each record in the playlist is an audio selection such as a musical composition for presentation to the vehicle occupant through multimedia system 120. Playlist 211 may specify that the sequence of selections be presented only once and then stop, or may specify a continuous playing of the selections by wrapping from the last to the first at the end of the sequence. Playlist 211 may take any of various structural forms, such as a table, a linked list, and so on. It should contain (either explicitly or by reference) sufficient data to enable a program to access each list selection in sequence from disk drive 103. Playlist 211 should also contain a record of the size of each selection, in number of blocks or other similar measure of data accesses.

PD flag 212 indicates whether a Playlist has been defined by the vehicle occupant. If so, this list is used to retrieve data into buffer 203 for play on multimedia system 120. If no playlist has been defined, the size of buffer 203 may be reduced accordingly. PR flag 213 indicates whether multimedia system 120 is in the process of presenting data to the user from the playlist, i.e., whether multimedia system 120 is "running" the playlist.

Playlist 211, PD flag 212 and PR flag 213 maintain their state when vehicle 110 is shut off (non-operational). In this case, multimedia system 120 stops presenting data, but the state of the system is frozen at the instant it stops. When the vehicle is again turned on (operational), play will resume. In the preferred embodiment, non-operational and operational correspond to the state of the vehicle ignition switch, since this is a good indication of whether the vehicle is in fact occupied. However, multimedia system could be triggered by some event other than the vehicle ignition switch. For example, multimedia system could be operated by an independent switch, or could be operated by a sensor which senses the presence of an occupant. As used herein, the terms "operational" or "non-operational", when applied to the vehicle, should be understood to mean any indication that the vehicle is occupied, and not necessarily limited to the state of the vehicle ignition switch.

The Interactive Control task receives input from a user to control the output of multimedia system 120. Input may be such things as volume or other audio parameter adjustment, radio tuning frequency, and so forth, as is known in the art. Preferably, input may also include the specification of a playlist. Such input may be received, e.g., through a plurality of buttons or switches (not shown) in multimedia system 120, through which the user specifies the desired data. A playlist, for example, may be input by entering numbers corresponding to desired selections on a numeric keypad. Such a form of interactive data entry is merely a single example, and as is known in the art, data may be entered in a variety of alternative ways, such as through pointing devices, voice recognition, and so forth. Through the Interactive Control task, the user may deleted a playlist, create a new playlist, or edit the existing playlist. The user may also direct the multimedia system to start playing from the playlist, or to stop playing from the playlist (which does not necessarily erase the playlist, but merely pauses the presentation until the user resumes it).

If the user creates a playlist using the Interactive Control task, PD flag 212 will be set "on". If the playlist is deleted, the PD flag will be reset "off". If the user, using the Interactive Control task, turns on multimedia system play from the playlist, PR flag 213 is set "on"; if the user turns off play from the playlist, PR flag 213 is set "off".

Preferably, the buffer itself is implemented as a wraparound buffer having two pointers, the first of which points to the end of data most recently written into the buffer, and the second of which points to the end of data most recently read from the buffer. The Buffer Fill task simply compares these pointers and accesses data on disk drive 103 to refill the buffer whenever the pointers indicate a predetermined amount of free space exists. Comparing the pointers can be done on a periodic or other basis, and the threshold amount for data access may be a fixed amount, or may depend on buffer size. After the buffer is refilled, the BufferFill task adjusts the first pointer. The Buffer Fill task is active only when the disk drive is data accessible.

The Buffer Empty task operates to supply data to multimedia system 120. Whenever PR flag 213 is set, the Buffer Empty task provides sequential presentation data to multimedia system at the appropriate data rate. This data transfer may be controlled by multimedia system 120 or by processor 101. Data may be transferred in discrete blocks for buffering in a comparatively small buffer (not shown) within multimedia system 120. As data is transferred out of buffer 203, the Buffer Empty task adjusts the second pointer.

The Buffer Allocation task allocates a variable amount of memory 102 for use in buffering data read from disk drive 103 to be sequentially presented to the vehicle occupant through multimedia system 120. The operation of the Buffer Allocation task is shown at a high level in FIGS. 4A and 4B.

The amount of buffer allocation depends in part on the current state of the vehicle and disk drive 103. For simplicity, three states of vehicle and drive may be defined (neglecting brief transition periods from one state to another). In a first state, disk drive 103 is data accessible, meaning that the disks are rotating at a speed sufficient for data access, and the drive is capable of accessing data within the normal operating parameters of actuator seek time, disk rotational latency, data transfer rate, and so forth. In a second state, vehicle 110 is operational, but drive 103 is not data accessible. In this second state, the disk drive may be in the process of becoming data accessible (spinning-up the disks), or it may simply be off and awaiting a command to spin-up. In the third state, the vehicle is non-operational and the disk drive is powered off (or about to be powered off).

As described below with reference to FIGS. 4A and 4B, buffer allocation is triggered whenever there is a change in state, or if in the second state, after a pre-determined time-out period. The reason for this is that any change in state affects the size of buffer needed. The needed buffer is relatively constant when in the first state. In the second state, the buffer needed depends on the time remaining to spin up the disk drive, which is variable. In the third state, the buffer size needed depends largely on the current disk drive temperature, which is also variable. But since it is difficult in the third state to spin up an excessively cold or hot drive in order to fill a larger buffer as the drive temperature changes, a drive temperature limit is estimated at the time the vehicle is shut off, and a buffer allocation is made at that time.

Figure 4A:
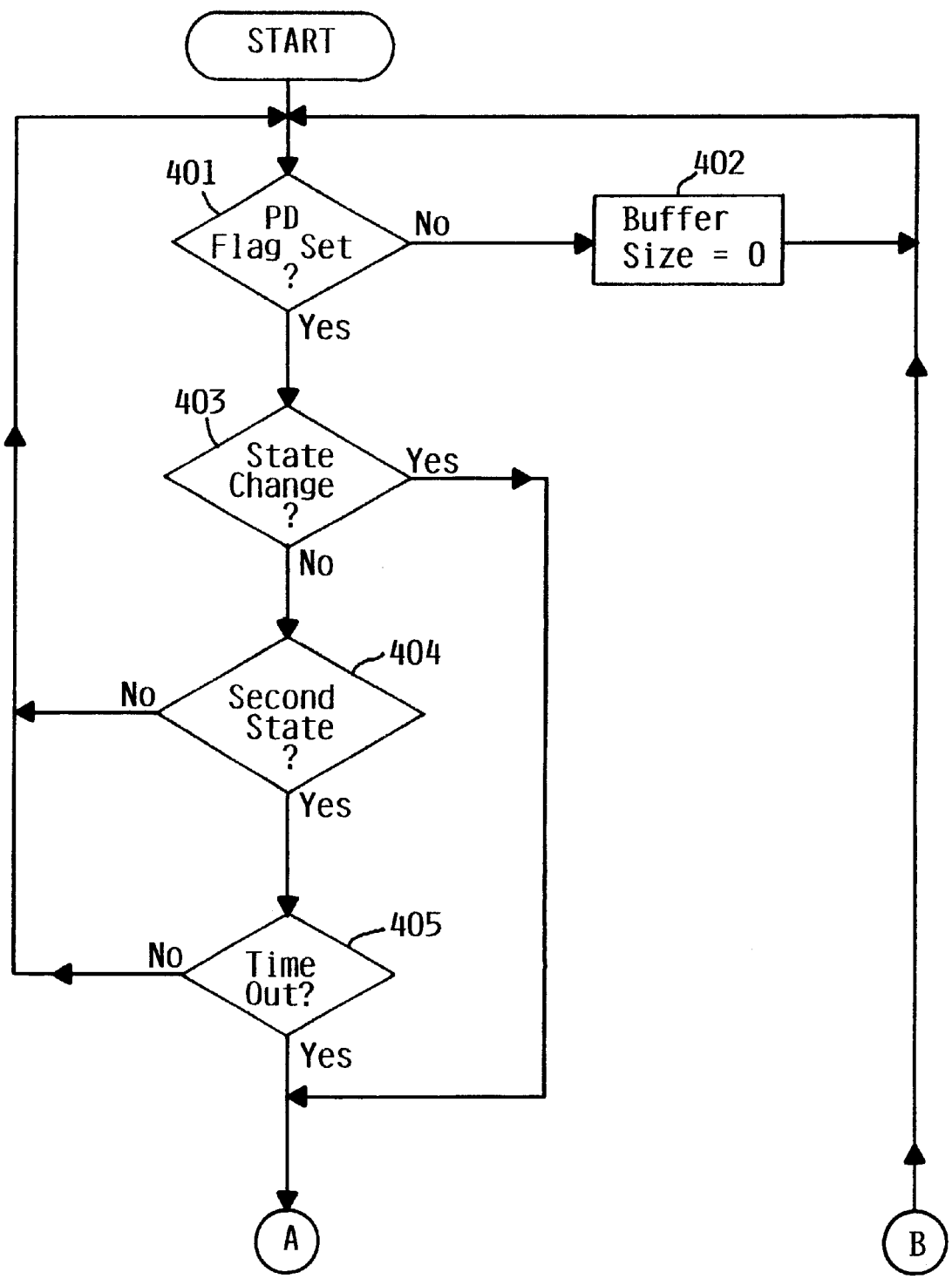
FIGS. 4A and 4B together illustrate a high level flow diagram of the process of allocating buffer for sequential data read from a disk drive storage device, according to the preferred embodiment.
Figure 4B:
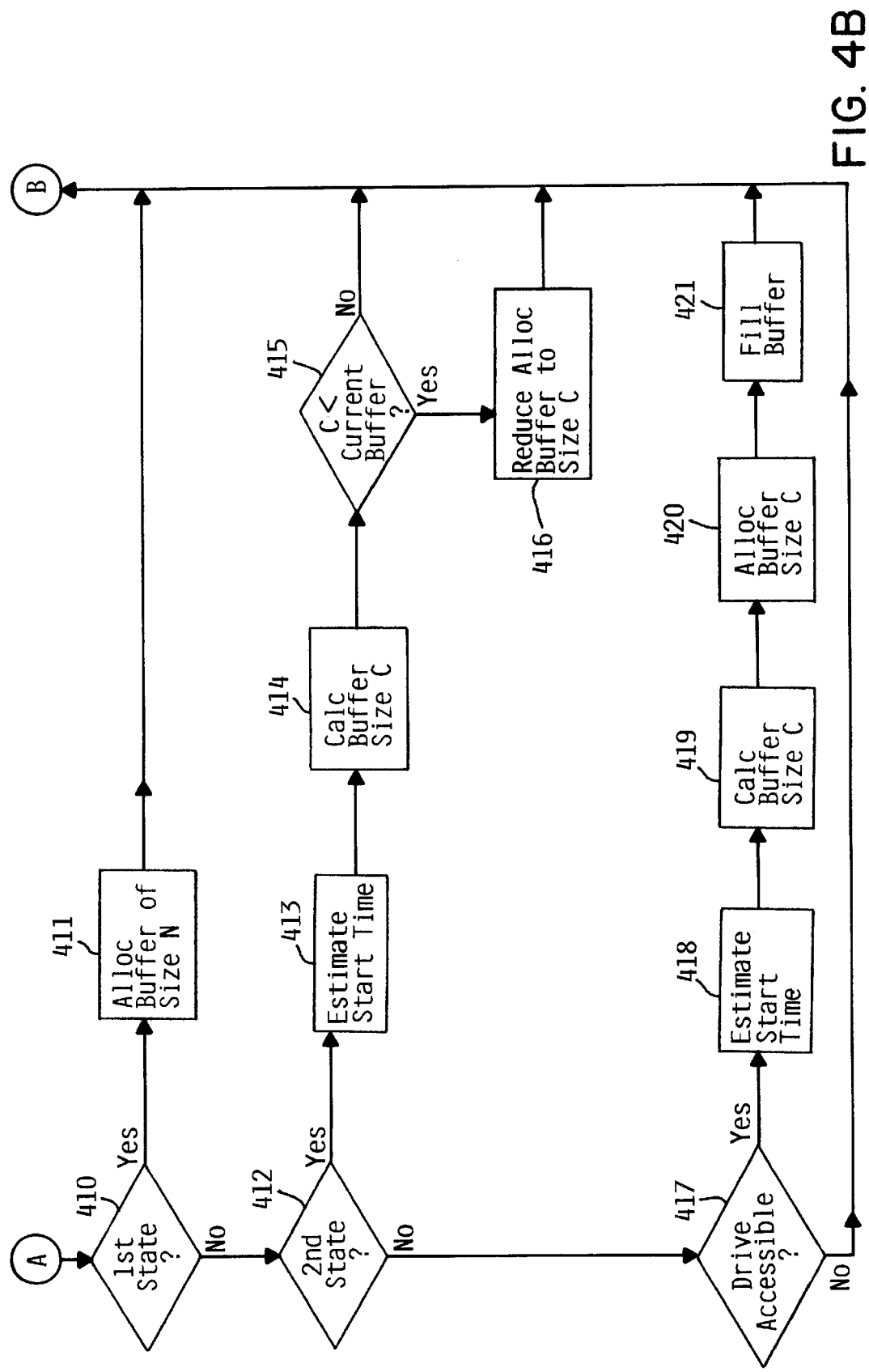

Turning now to FIGS. 4A and 4B, a determination is made at step 401 whether PD flag 212 is set. If PD flag 212 is not set, then no playlist has been defined. In this case, there is nothing to put in buffer 203, and accordingly the buffer size is set to 0 at step 402.

If a playlist is defined ("Y" branch from step 401), a determination is made whether a state change has taken place (step 403). A state change causes the task to jump to step 410 to evaluate the necessary buffer size; otherwise, the task continues to step 404. At step 404, a determination is made whether the disk drive and vehicle are now in the second state, i.e., the vehicle is operational but the drive is not. If not, the task returns to step 401. If so, a determination is made at step 405 whether a timer has expired. If the timer has not expired, the task returns to step 401; otherwise it continues to step 410. It will be appreciated by those skilled in the art that step 401–405 are shown conceptually as the logical trigger conditions for evaluating and allocating a buffer of a given size, and that a task does no necessarily sit in an idle loop as indicated by re-executing these steps. The buffer allocation task may be triggered by interrupts or calls from other tasks which respond to state changes.

If the disk drive and vehicle are now in the first state, i.e., the vehicle is operational, and the drive is capable of accessing data, than the "Y" branch is taken from step 410, and a buffer of pre-determined fixed size N is allocated (step 411). N is a relatively small buffer size, sufficient to enable uninterrupted presentation of sequential data in the presence of sudden acceleration/deceleration, road irregularities, or similar occurrences which may temporarily prevent the disk drive from reading data. Typically, such occurrences are of relatively short duration, affecting disk drive access for a fraction of a second to perhaps several seconds. N should be sufficient to transcend this brief interval, but no larger. The length of the interval will depend on numerous design factors involving the disk drive itself, how the drive is mounted within the vehicle, and the motor vehicle itself.

If the vehicle and drive are now in the second state, i.e., the vehicle is operational, but the disk drive is either not spinning, or is in the process of spinning up, then the "Y" branch is taken from step 412. In this case, the Buffer Allocation task estimates the time remaining to bring the disk drive to a data accessible condition (step 413). This time calculation is described in greater detail below. The buffer size needed is then calculated as the product of the time remaining to access data and the data rate (bits per unit time) of sequential data presentation (step 414). The calculated buffer size from step 414 is then compared to the present buffer size (step 415). If the calculated buffer size C is greater than or equal to the current buffer size, then the "N" branch from step 415 is taken, and no change is made to the buffer. If the calculated buffer size C is less than the current buffer size, then the "Y" branch is taken from step 415, and the buffer allocation is reduced to the calculated size needed (step 416). When reducing the buffer size at step 416, the Buffer Allocation task may have to adjust the first pointer in the buffer so that it points to something within the buffer. In general, it will be expected that if the vehicle and drive are in the second state, the time remaining to access data will decline with each successive time out at step 403, and therefore the buffer will be gradually reduced in size. Reducing buffer size thusly frees up memory for other uses. If, however, additional buffer is needed (the "N" branch from step 415), there is no point in allocating a larger buffer because the disk drive is not available to fill it. Therefore, when in the second state, the buffer only gets smaller, never bigger.

If the "N" branch is taken from step 412, then the vehicle and drive are in the third state, i.e., the vehicle is not operational. To be more specific, this branch will only be taken when the vehicle has just entered the third state, i.e., just become non-operational. In this case, the disk drive may remain operational for a brief period while essential data is saved or sequential presentation data is read into the buffer. Therefore, at step 417, the Buffer Allocation task checks whether the disk drive is data accessible. Typically, if the vehicle has been operating for any length of time and the occupant has been receiving a multimedia presentation from system 120, the drive will be data accessible. If the drive is not data accessible, the "N" branch is taken from step 417, and the buffer remains unchanged. If the drive is data accessible, the "Y" branch is taken from step 417. In this case, the Buffer Allocation task estimates the time that will be required to access data on the disk drive when the vehicle is restarted as described below (step 418), and calculates the buffer size needed by multiplying the time estimated at step 418 by the data rate (step 419). A buffer of the necessary size is then allocated in memory 102 (step 420). This buffer is necessarily larger than N, the buffer size for an operational disk drive. Allocating a larger buffer will cause the Buffer Fill task to fill the buffer with data from the disk drive (step 421). While step 421 is actually performed by the Buffer Fill task, it is shown in FIG. 4 for clarity of illustration.

At steps 413 and 418, the Buffer Allocation task estimates the time required to bring the disk drive to a data accessible condition. In general, this time is the sum of two components, $t_p$ and $t_s$, where $t_p$ is the estimated preparation time to bring the drive within its specified environmental operating parameters, and $t_s$ is the time required to start the drive (specifically, to spin up the disk drive spindle motor) once the drive is within its operating parameters. In general, $t_s$ is a fixed time period which depends on the disk drive design specifications, although it could alternatively be calibrated to an individual drive by simply recording spin-up times required on past occasions. Where the disk drive is in the second state and has already begun to spin up, then $t_s$ should be calculated as the time remaining in this fixed interval. The time to bring the disk within operating parameters, $t_p$, is heavily dependent on temperature. Where the vehicle and disk drive are in the second state (step 413), $t_p$ depends on the present temperature of the disk drive itself (or area immediately surrounding the disk drive), which is preferably measured with a temperature sensor (not shown). The difference between the present temperature and the minimum (or maximum, as the case may be) operating temperature of the disk drive is a temperature change ($\Delta T$) which must take place before the drive can be started. Environmental system 113 has a known heating (or cooling) capacity, from which $t_p$ can be estimated given $\Delta T$. This estimate may, e.g., be a linear approximation which assumes a fixed temperature change per unit time, be a more complex mathematical function, or may be derived from a table. When the vehicle and drive are in the third state (step 418), the same formula is used, but instead of the present temperature of the drive, the ambient temperature outside the vehicle is used (on the assumption that the drive will be near ambient temperature when the vehicle is restarted). It would further be possible to add an adjustment to ambient temperature, to account for likely changes in ambient temperature (as a drop in temperature overnight) or likely increases above ambient temperature within the vehicle (as in sunlight heating the vehicle compartment by day).

While in the preferred embodiment, only temperature is used for simplicity, it would be possible to measure other environmental parameters to increase the accuracy of the time estimates. For example, one could measure the amount of sunlight to estimate the effect this will have on the vehicle compartment.

A variable sized buffer allocation is made when the vehicle is in the third state (non-operational) on the assumption that memory 102 might be used for storing other data during this period, and that the buffer should therefore be no larger than necessary. For example, if a significant part of memory 102 is used for user applications and data 205, it might be useful to leave these applications in memory 102 in the event that the user may wish to have them again. A variable sized buffer allocation for multimedia data may leave some space available for such user applications. Alternatively, buffer allocation in the third state could simply be a fixed size large enough to accommodate most if not all environmental conditions to which the vehicle will be exposed.

Figure 5:
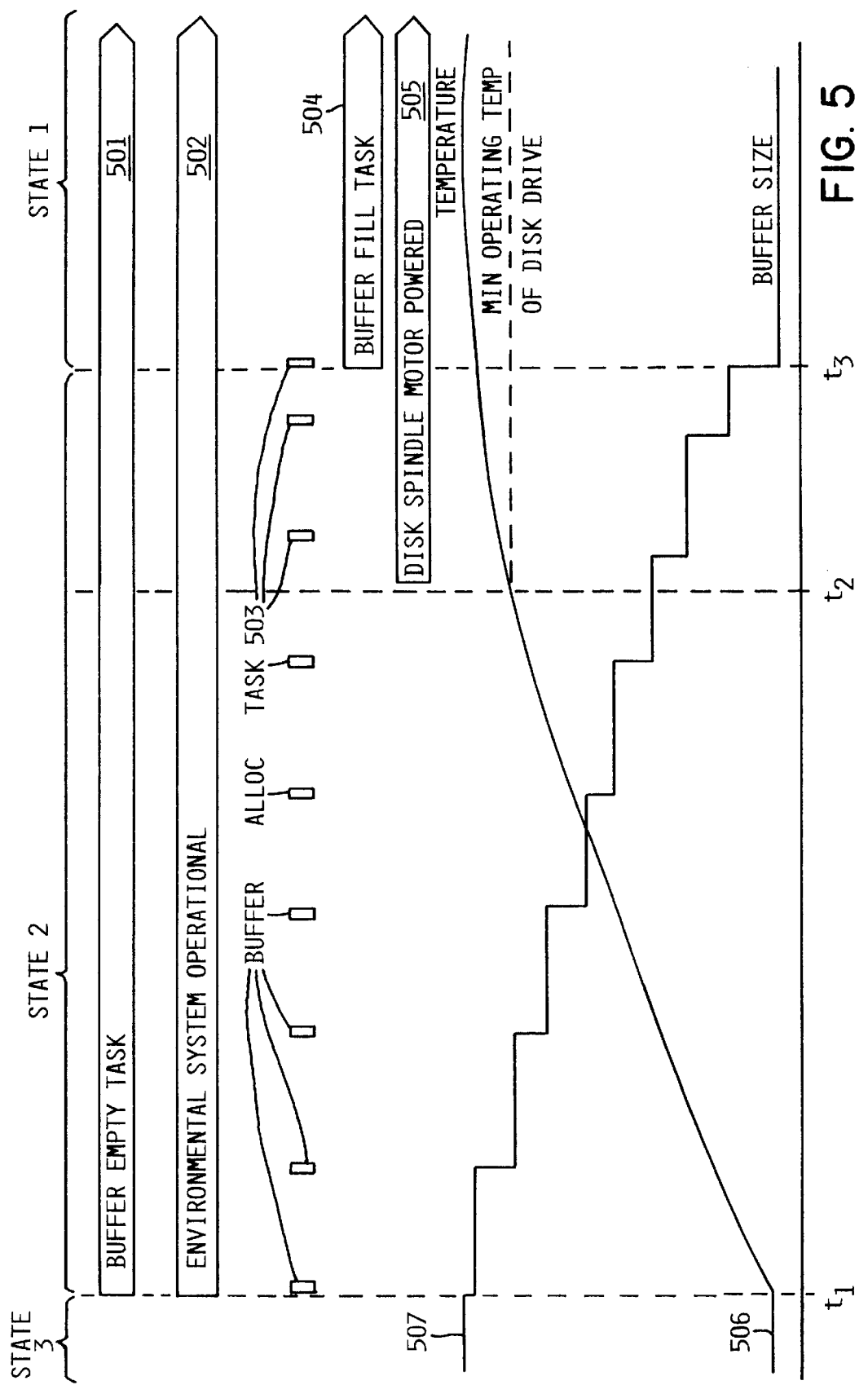
FIG. 5 is a timeline depicting an example of how the various tasks and hardware apparatus operate together during the typical start-up period for a cold motor vehicle, according to the preferred embodiment.

FIG. 5 is a timeline depicting how the various tasks and hardware apparatus operate together during the typical start-up period for a cold motor vehicle. Before time $t_1$, the vehicle and disk are in state 3, i.e. they are not operating and are cold. At time $t_1$, and occupant starts the vehicle engine, causing a state change to the second state. In response to starting the vehicle, the Buffer Empty task is initiated and begins sending sequential presentation data stored in buffer 203 to multimedia system 120, as indicated by process bar 501. At approximately the same time, control programs 202 begin operation of environmental system 113 to warm up the compartment and disk drive, as indicated by process bar 502. While in the second state, the Buffer Allocation task is periodically called, as indicated by processes 503.

As time passes with the environmental system 113 operating, the temperature of the disk drive gradually increases, as shown by temperature line 506. The increase in temperature causes the Buffer Allocation task to reduce its estimate of the time remaining before the disk drive is data accessible (calculation at step 413) each time the task performs the calculation. As a result, the buffer size is reduced with each call to the Buffer Allocation task. Buffer size line 507 shows the size of the buffer over time, and shows stepped decreases in buffer size.

At time $t_2$, the temperature of the drive has reached the minimum operating temperature. Upon sensing this, control program 202 issues an appropriate start-up command to the drive, causing it to start the spindle motor. Powering of the spindle motor is represented by process bar 505.

At time $t_3$, the spindle motor and disk assembly reaches operational speed, at which it is possible to access data. The disk drive sends an appropriate message to that effect to processor 101, causing a state change to state 1. Master control program 201 initiates the Buffer Fill task, as represented by process bar 504. The Buffer Allocation task is called one last time and the buffer is set to its operating size N. Thereafter, the Buffer Fill and Buffer Empty task operate concurrently using a relatively small buffer.

While the example of FIG. 5 illustrates a timeline for start-up from a cold condition, it will be understood that analogous steps would be taken if the vehicle were initially in an excessively hot condition, with drive temperature dropping as environmental system 113 cools the drive to the appropriate temperature range.

Preferably, a mechanism exists to sense when data in the buffer has been lost or corrupted. This could occur, e.g., due to vehicle battery failure or disconnection, or as a result of some unusual electronic noise. Detection could be accomplished through the use of any of various known encoding schemes such as parity or checksumming, or could be accomplished with special hardware such as a latch which latches in the event of a power failure or surge. Upon detection corrupted data, the control program would not attempt to use the data, and would wait until data stored on the disk drive becomes accessible.

As described herein, sequentially presented data is retrieved from disk drive 103, Such data may be recorded in drive 103 by any of various conventional means, and multiple means may be used, depending on the type of data. For example, certain data may be pre-loaded by the motor vehicle manufacturer or dealer using special interfaces. Alternatively, motor vehicle 110 may include a conventional data input device, such as a compact disk read only memory (CD-ROM) drive, a floppy disk drive, or the like, for loading data. As a further alternative, data may be transmitted from an external source to a receiver in vehicle 110, from which it is stored in disk 103. As a further alternative, disk drive 103 may be a removable disk drive, which is physically withdrawn from vehicle 110 and placed in another device, such as a desktop computer system, for downloading of data.

As described above in the preferred embodiment, multimedia data such as music is stored in the buffer from the disk drive for presentation to the user. It should be understood that music being presented in a fixed order from a playlist is but one example of sequentially presented data. "Sequentially presented" data as used herein is not limited to multimedia data, nor is "sequentially presented" meant to imply anything about the format in which such data is stored in the disk drive, nor is it meant to imply that such data must have an associated playlist or similar data structure. "Sequentially presented" data encompasses any data which will have a predictable pattern of access in the immediate future, making it practical to buffer the data for presentation during the interval in which the disk drive will be unavailable to start-up. For example, such data could include a series of e-mail messages to be presented to the user, or could include certain automotive diagnostics code that is run when the engine is started up. Finally, the data stored in the buffer could vary depending on any of various factors, and could be based on likelihood of use. For example, certain cold weather diagnostic routines which are more likely to be applicable under cold conditions could be buffered in extreme cold weather, while other hot weather routines typically applicable in hot conditions might be buffered in hot weather.

In the preferred embodiment, a master control program allocates a portion of general purpose memory for use in buffering sequential data, the amount of such memory allocated to the buffer being variable, depending on certain conditions. It is believed that such an allocation scheme accomplishes optimal use of available hardware resources, allowing the buffer to be used for other purposes when it is unlikely to be needed for sequential data. It will be understood that the method of changing the buffer size is merely one embodiment, and that a buffer for sequential data could be allocated on a different basis. Specifically, it would be possible to allocate a buffer for such data only when the drive is shut off, and to allocate no such buffer at other times. It would alternatively be possible to buffer sequential data, for playback when the disk drive is restarted as described herein, in a fixed sized buffer, which could be a dedicated device having no other use than the buffering of such data.

In general, the routines executed to implement the illustrated embodiments of the invention, whether implemented as part of an operating system or a specific application, program, object, module or sequence of instructions are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, digital versatile disks (DVD's), magnetic tape, and transmission-type media such as digital and analog communications links, including wireless communications links. Examples of signal-bearing media are illustrated in FIG. 1 as memory 102 and disk drive 103.

Although a specific embodiment of the invention has been disclosed along with certain alternatives, it will be recognized by those skilled in the art that additional variations in form and detail may be made within the scope of the following claims:

What is claimed is:

1. A motor vehicle based data processing system, comprising:

a rotating magnetic fixed disk drive data storage device;

a storage buffer, said storage buffer comprising semiconductor memory, said buffer receiving data from said disk drive data storage device;

a controller controlling the operation of said disk drive data storage device, said controller retrieving sequentially presented data from said buffer for use during a time interval in which said disk drive data storage device is being powered up and data is not yet accessible from said disk drive data storage device;

wherein said storage buffer is contained in a random access memory of a fixed size having an address space, and wherein a portion of said address space is allocated to said storage buffer to store said sequentially presented data, said portion being of a variable size;

wherein a first portion of said address space is allocated to storing said sequentially presented data when the motor vehicle is operating, and a second portion of said address space is allocated to storing said sequentially presented data when the motor vehicle is not operating, said second portion being larger than said first portion.

2. The motor vehicle based data processing system of claim 1, wherein said controller comprises a programmable processor executing executable instructions of a control program, said executable instructions being executed from said random access memory.

3. The motor vehicle based data processing system of claim 1, wherein the size of the variable sized portion of said address space allocated to store said sequentially presented data depends on an estimated time to access data stored on said rotating magnetic fixed disk drive data storage device.

4. The motor vehicle based data processing system of claim 1, wherein the size of the variable sized portion of said address space allocated to store said sequentially presented data depends on temperature.

5. The motor vehicle based data processing system of claim 1, wherein said sequentially presented data is multimedia data presented for the entertainment of an occupant of the motor vehicle.

6. The motor vehicle based data processing system of claim 1, wherein said controller further stores a playlist data structure in said semiconductor memory, said playlist data structure specifying a fixed order of presentation of multiple files of said sequentially presented data.

7. A method of operating a motor vehicle based data processing system having at least one rotating magnetic disk drive data storage device, comprising the steps of:
   allocating a variable sized portion of a fixed size random access semiconductor memory of said motor vehicle based data processing system for use as a buffer;
   reading data for sequential presentation from said rotating magnetic disk drive data storage device into said buffer;
   deactivating said rotating magnetic disk drive data storage device after said reading step;
   detecting a demand for said data for sequential presentation while said rotating magnetic disk drive data storage device is deactivated;
   reactivating said rotating magnetic disk drive data storage device responsive to said step of detecting a demand, said reactivating step occupying a time interval during which data is unavailable from said rotating magnetic disk drive data storage device; and
   sequentially presenting said data for sequential presentation from said buffer during said time interval;
   wherein a first portion of said random access semiconductor memory is allocated to said buffer when the motor vehicle is operating, and a second portion of said random access semiconductor memory is allocated to said buffer when the motor vehicle is not operating, said second portion being larger than said first portion.

8. The method of claim 7, wherein the size of said variable sized portion of said random access semiconductor memory allocated to said buffer depends on an estimated time to access data stored on said rotating magnetic disk drive data storage device.

9. The method of claim 7, wherein the size of said variable sized portion of said random access semiconductor memory allocated to said buffer depends on temperature.

10. The method of claim 7, wherein said data for sequential presentation is multimedia data presented for the entertainment of an occupant of the motor vehicle.

11. The method of claim 7, further comprising the step of maintaining a playlist data structure in said random access semiconductor memory, said playlist data structure specifying a fixed order of presentation of multiple files of said data for sequential presentation.

12. A program product for controlling the operation of a motor vehicle based data processing system, said data processing system having at least one rotating magnetic disk drive data storage device, said program product comprising:
   a plurality of processor executable instructions recorded on signal-bearing media, wherein said instructions, when executed by at least one programmable processor of said motor vehicle based data processing system, cause the system to perform the steps of:
      allocating a variable sized portion of a fixed size random access semiconductor memory of said motor vehicle based data processing system for use as a buffer;
      reading data for sequential presentation from said rotating magnetic disk drive data storage device into said buffer;
      deactivating said rotating magnetic disk drive data storage device after said reading step;
      detecting a demand for said data from sequential presentation while said rotating magnetic disk drive data storage device is deactivated;
      reactivating said rotating magnetic disk drive data storage device responsive to said step of detecting a demand, said reactivating step occupying a time interval during which data is unavailable form said rotating magnetic disk drive data storage device; and
      sequentially presenting said data for sequential presentation from said buffer during said time interval;
      wherein a first portion of said random access semiconductor memory is allocated to said buffer when the motor vehicle is operating, and a second portion of said random access semiconductor memory is allocated to said buffer when the motor vehicle is not operating, said second portion being larger than said first portion.

13. The program product of claim 12, wherein the size of the variable sized portion of said random access semiconductor memory allocated to said buffer depends on an estimated time to access data stored on said rotating magnetic disk drive data storage device.

14. The program product of claim 12, wherein the size of said variable sized portion of said random access semiconductor memory allocated to said buffer depends on temperature.

15. The program product of claim 12, wherein said data for sequential presentation is multimedia data presented for the entertainment of an occupant of the motor vehicle.

16. The program product of claim 12, wherein said processor executable instructions further cause the system to perform a step of maintaining a playlist data structure in said random access semiconductor memory, said playlist data structure specifying a fixed order of presentation of multiple files of said data for sequential presentation.

* * * * *